Oct. 24, 1950 W. P. GALLAGHER 2,527,249
SEQUENCE SWITCH
Filed Jan. 3, 1947 2 Sheets-Sheet 1
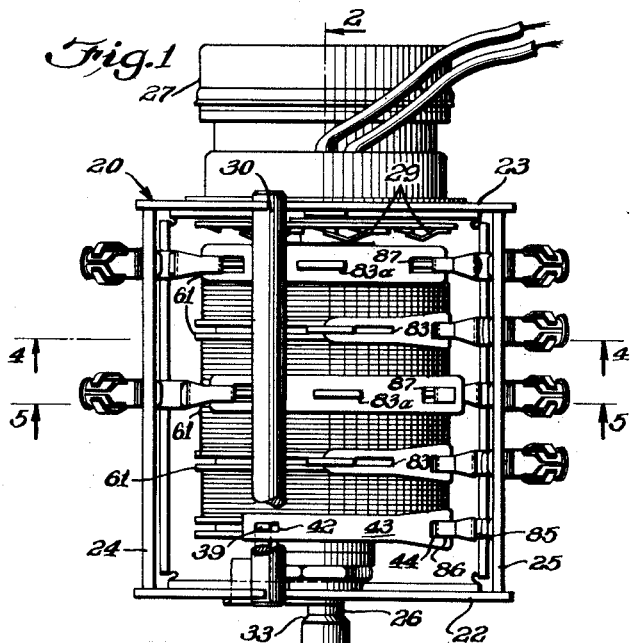
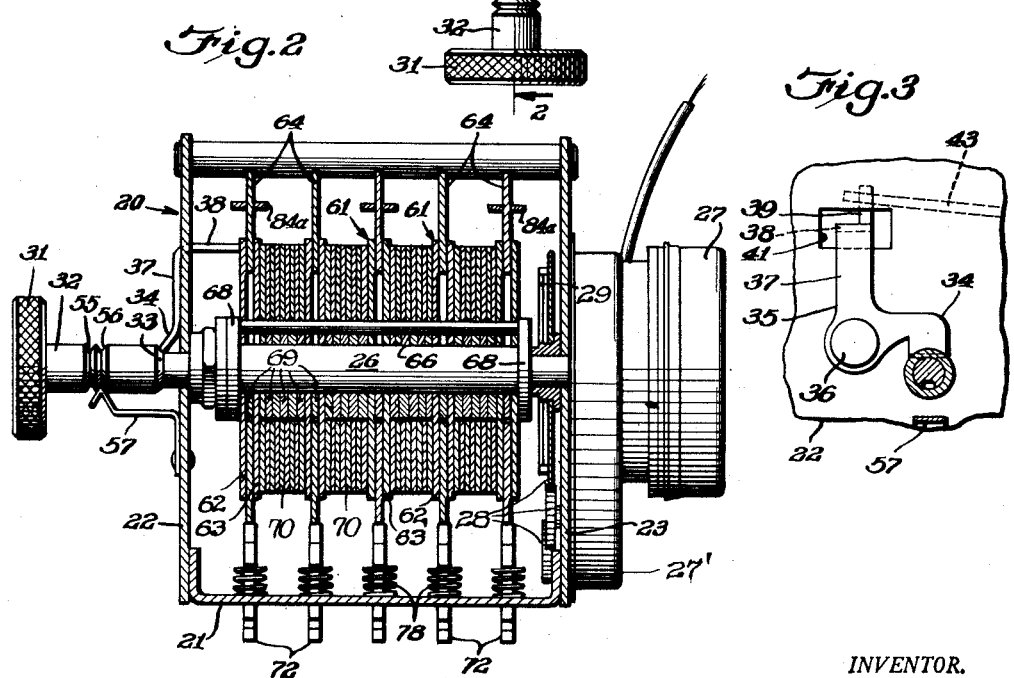
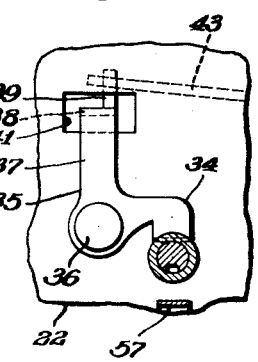
INVENTOR.
William P. Gallagher
BY Brown, Jackson,
Boettcher & Dienner
Att'ys.

Oct. 24, 1950 W. P. GALLAGHER 2,527,249
SEQUENCE SWITCH
Filed Jan. 3, 1947 2 Sheets-Sheet 2
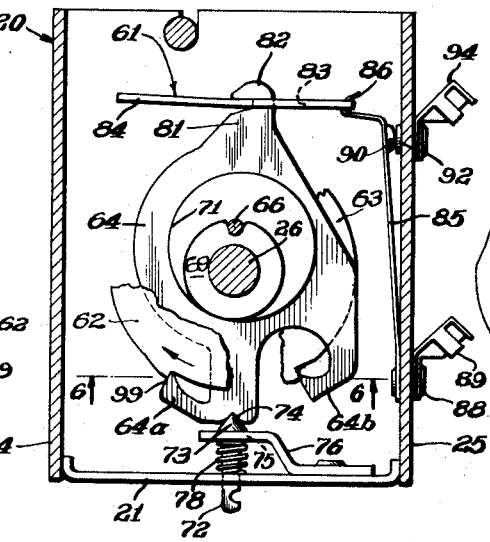
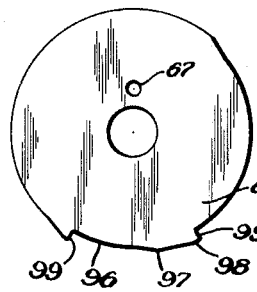
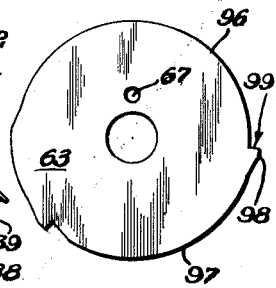
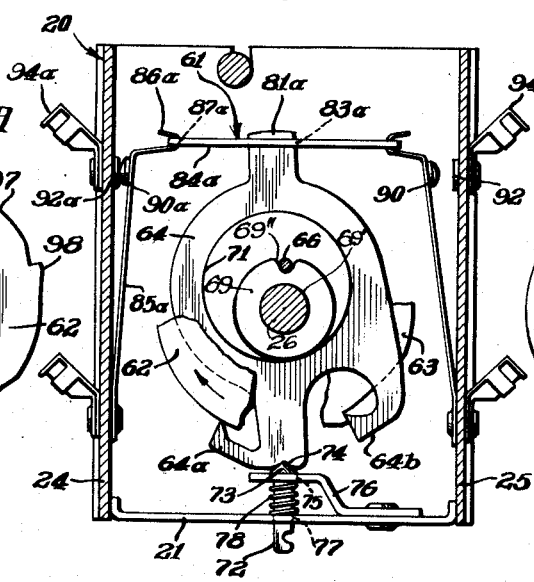
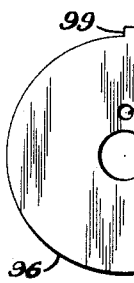
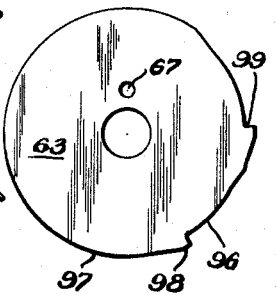
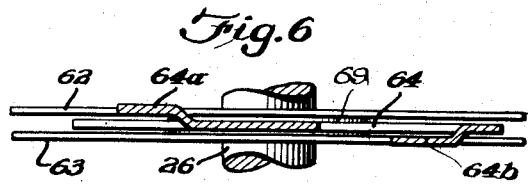
INVENTOR.
William P. Gallagher
BY Brown, Jackson,
Boettcher & Dienner
Att'ys.

Patented Oct. 24, 1950

2,527,249

UNITED STATES PATENT OFFICE 2,527,249

SEQUENCE SWITCH

William P. Gallagher, Chicago, Ill., assignor to International Register Company, Chicago, Ill., a corporation of Illinois Application January 3, 1947, Serial No. 720,110

18 Claims. (Cl. 200—38)

The present invention relates to an improved sequence switch adapted to close or open a plurality of electrical circuits in timed sequence.

My improved sequence switch has been devised primarily for controlling the timed sequence of operations in an automatic washing machine of the type in which different operations occur automatically, such as soaking, washing, rinsing and centrifugal drying. However, I wish it to be understood that my improved sequence switch is also adaptable to numerous other uses, such as a program switch for controlling an automatically timed program, a traffic control switch for controlling traffic signal lights, and other equivalent uses.

In its preferred embodiment, my improved sequence switch utilizes a slowly rotating, continuously driven rotor for actuating the electrical contacts which close and open the different control circuits in automatic program sequence. One of the objects of the invention is to provide improved switch actuating mechanism which will give a high degree of accuracy to the starting of a control period or interval and to the stopping of a control period for interval, notwithstanding the relatively slow rotation of this continuously moving rotor. This is important in a washing machine timer wherein a considerable number of predetermined control intervals must be crowded into a relatively short over-all interval, and wherein there must also be a certain amount of accurately timed overlapping of different control intervals.

Another object of the invention is to provide improved switch actuating mechanism which can give an accurately timed control interval of extremely short duration, notwithstanding the relatively slow rotation of the continuously moving rotor.

Another object of the invention is to provide an improved sequence switch in which the timed program can be set up in a relatively simple manner. Each switch actuator is made to respond to a cooperating pair of rotating cam disks constituting part of the rotor assembly, and the opening and closing movements of this switch actuator can be varied by merely changing the angular relationship between these two disks when the disks are paired together.

Another object is to provide an improved construction of manually actuated master switch for the timer which will enable all of the control circuits to be instantly interrupted by a simple manual operation. This is advantageous for emergencies and also for interrupting a program in order to start over again.

Other objects, features and advantages of the invention will be apparent from the following detail description of one preferred embodiment of the invention. In the accompanying drawings illustrating such embodiment:

Figure 1 is a plan view of my improved sequence timer;

Figure 2 is a vertical longitudinal sectional view through the timer;

Figure 3 is a fragmentary front elevational view showing the master switch actuating mechanism;

Figure 4 is a transverse sectional view taken approximately on the plane of the line 4—4 of Figure 1, showing one switch assembly;

Figures 4A and 4B are detail views of the two companion cams for governing the switch assembly of Figure 4;

Figure 5 is a transverse sectional view taken approximately on the plane of the line 5—5 of Figure 1, showing another switch assembly;

Figures 5A and 5B are detail views of the two companion cams for governing the switch assembly of Figure 5; and Figure 6 is an enlarged transverse sectional view taken approximately on the plane of the line 6—6 of Figure 4 to show the straddling or offset relation of the two cam rider arms in their contact with the two companion cam disks.

The switch is assembled within a box-like housing 20, comprising a bottom plate 21, two end plates 22 and 23, and two side plates 24 and 25. The upper portions of the two end plates 22 and 23 can be joined by a spacing post 30. Extending centrally through this box and having suitable bearing support in the end walls 22 and 23 is a drive shaft 26, which rotates the switch actuating cam. This shaft is driven from an electric motor 27, which is preferably mounted on the outer side of the rear wall 23. The motor is preferably an alternating current synchronous motor, but it will be understood that any other motor of substantially constant speed characteristics may be employed. The gear reduction from the motor 27 to the drive shaft 26 is such that the drive shaft will make one revolution over the span of the entire program interval. For example, in washing machine timers, the overall program interval is usually about 30 minutes, but may extend up to approximately an hour. The large ratio of speed reduction preferably occurs within a gear housing 27' extending from the motor housing 27. A set of changeable ratio gears 28 (Figure 2) transmits this reduced speed drive to the shaft 26, and if in the manufacture of these sequence switches one lot is to have a long program interval, such as one revolution per hour, and another lot is to have a shorter interval, such as one revolution per half hour, this can be readily provided for by merely changing the ratio of the changeable ratio gear set 28.

Also, in the case of a washing machine timer, it may be additionally desirable to arrange the mechanism so that the housewife can vary the time interval of one or more of the different operations in the cycle. This can be provided for in several ways, such as by including a conventionl slippage clutch in the drive between the motor 27 and shaft 26, either with or without a one-way ratcheting feature. For example, if it is desired that the housewife be able to advance the rotor shaft 26 in a forward direction, and still not be able to turn the shaft in a backward direction, such can be arranged for by providing a ratchet mechanism enabling the shaft 26 to be turned forwardly but not rearwardly with respect to the motor 27. One construction of a one-way drive device, which I may employ in the present sequence switch, is disclosed in my prior Patent No. 2,400,818 issued May 21, 1946, such a one-way drive device being indicated at 29 in Figure 1. This one-way drive device is preferably interposed between the changeable ratio gear set 28 and the shaft 26.

Mounted on the front end of the drive shaft 26, beyond the front wall 22 of the housing, is a control knob 31. This knob is secured to a sleeve 32, which has a sliding fit over the shaft 26 whereby the knob can be pushed inwardly to cut the entire device out of circuit for emergency situations, as I shall presently describe. If the unit is of the type that can be advanced for shortening any of the program intervals, then the sleeve 32 has a splined or keyed connection with the shaft 26 for transmitting rotation thereto, or a one-way ratchet may be interposed between the sleeve 32 and the shaft 26, which will function to transmit forward rotation to the shaft from the konb, but which will be incapable of transmitting reverse rotation to the shaft. The inner end of the sleeve 32 has a beveled annular cam surface 33, which is adapted to transmit upward motion to the horizontal arm 34 of a bell crank lever 35 when the knob and sleeve are thrust inwardly. The lever 35 is pivotally supported on a stud 36 projecting outwardly from the front wall 22 of the housing. An upwardly extending arm 37 of this lever has its upper portion bent inwardly at 38, and then again upwardly at 39, as shown in Figures 2 and 3. The inwardly bent portion 38 passes through a slot 41 punched out of the end wall 22, and the upwardly bent end portion 39 passes through an opening 42 in one end of an insulating link 43 which is arranged to actuate a master switch controlling the supply circuit to the control contacts of the present sequence switch. As shown in Figure 1, the other end of this insulating link 43 is provided with a slotted opening 44 in which engages the hook shaped upper end 86 of a contact spring 85. There is a bank of these contact springs 85 assembled across the right hand wall 25 of the housing, there being one of these contact springs for each timer or sequence switch assembly and also one for the master control switch. In Figure 4 I have shown the contact spring 85 as being actuated by a sequence switch assembly, but it will be understood that the same arrangement of contact spring 85 is also provided for the master switch now being described. This contact spring 85 extends downwardly along the side wall 25 and has its lower end anchored thereto by a connector rivet 88. The outer end of this connector rivet passes through the attaching lug of a terminal clip 89 adapted to establish connection with a supply circuit. The upper portion of the contact spring carries a movable contact 90, which normally engages a stationary contact 92, the outer end of this latter contact having riveted, or other fastening, to the attachment lug of another terminal clip 94, or being connected with a bus conductor leading to other contacts of the sequence switches. As previously described, the contacts 90 and 92 function as a master switch for controlling the main supply circuit to the various control contacts of the sequence switches, this master switch being normally closed, but being capable of a quick opening in emergency situations, or in other operating situations, by the mere inward thrusting of the knob 31. As shown in Figure 2, the slidable sleeve 32 has two annular grooves 55 and 56 formed therein in which engages the V-shaped portion of a detent leaf spring 57, this detent spring releasably holding the knob 31 in either its switch closed, or switch open position.

Mounted at spaced points along the drive shaft or rotor 26 are the several independent sequence switch assemblies 61 which perform the different control functions of the program. In Figure 2 I have illustrated four of these sequence switch assemblies 61 mounted on the rotor shaft 26, (the fifth switch assembly to the left being the master switch), but it will be understood that any greater or lesser number of sequence switch assemblies may be employed, depending upon the number of automatic operations in the program. As will hereinafter appear, each of these sequence switch assemblies can be a single throw unit or a double throw unit, and can also be of single pole, double pole, or even larger size. Referring to Figures 4, 5 and 6, each of these switch assemblies 61 comprises two coaxial, concurrently rotating cam disks 62 and 63, between which is mounted an oscillatory switch actuator 64 which is adapted to respond to cam formations on the peripheries of both disks 62 and 63. As shown in Figure 2, the cooperating pairs of cam disks of all of the switch assemblies 62 are positively driven together in unison from the rotor shaft 62 through the medium of a drive pin 66 which passes through aligned holes 67 in all of the cam disks. The ends of the drive pin 66 are mounted in collars 68 which rotate with the shaft 26. As shown in Figure 4, each oscillatory switch actuator 64 has a relatively large central hole 71 formed therein, which clears the drive pin 66 so that this switch actuator is not caused to rotate with the cam disks. Mounted in this large central hole 71 in each switch actuator 64 is a spacer 69, preferably metallic, having a central hole 69' which slips over the shaft 26 and having a peripheral notch 69'' which receives the drive pin 66. This spacer prevents the two cam disks 62 and 63 of each switch actuating assembly from being crowded together into tight frictional contact against the sides of the intervening switch actuator 64, which, if permitted, might tend to drive the switch actuator. Referring to Figure 2, the several switch assemblies are all spaced from each other along the shaft 26 by a distance sufficient to meet the underwriter's requirements for the voltage effective on the switch contacts. This spacing is maintained by sets of notched washers 69 between switch assemblies. Surrounding these sets of notched washers 69 between switch assemblies are stacks of absorbent washers 70 preferably composed of blotting cardboard or other absorbent material which can absorb and retain oil. These are impregnated with oil so that they can oil the cam disks 62, 63 and the switch actuator 64 by oil creepage.

In each switch assembly, the switch actuator 64 functions as a straddle element having straddle contact with the cam peripheries of its associated pair of cam disks 62 and 63, whereby this straddle element snaps first in one direction and then in the other direction in response to the cam formations on the cam disks. To this end, each oscillatory switch actuator has two cam riding arms 64a and 64b projecting downwardly to ride on the peripheries of the cam disks 62 and 63, respectively. The cam rider arm 64a, which rides on the front disk 62, is bent forwardly from the plane of the plate 64 so as to lie in the plane of the front cam disk 62, and the other cam rider arm 64b is bent rearwardly so as to lie in the plane of the rear cam disk 63. Viewing the assembly endwise from the front (Figure 4), it will be seen that there is a substantial angular spacing between the two rider arms 64a and 64b. In the preferred construction shown, this angle is approximately 60 degrees, i. e., the cam rider 64b engages the back disk 63 at a point approximately 60 degrees ahead of the point where the other cam rider 64a engages the front cam disk 62. These two cam riders 64a and 64b are constantly pressed upwardly against the lower peripheral portions of the cam disks 62 and 63 by the action of a spring pressed plunger 72, which applies upward thrusting force to the switch actuator 64 at a point substantially midway between the riders 64a and 64b. The upper end of the plunger 72 is formed with a V-shaped head 73, which engages in a V-shaped recess 74 formed in the bottom portion of the switch actuator 64. The head 73 is of a more acute angle than the recess 74, so that the head has substantially line contact with the switch actuator, whereby there is complete freedom of pivoting movement of the switch actuator on the spring plunger when the switch actuator tilts about either of the cam rider projections 64a and 64b. The head 73 of the plunger slides in a guide slot 75 punched in a guide plate 76, and the shank portion of the plunger 72 slides in a guide slot 77 punched in the bottom plate 21 of the housing. A compression spring 78 confined between the bottom plate 21 and the under side of the plunger head 73 constantly tends to hold the plunger 72 pressed upwardly into the V-shaped recess 74. It will be understood that there is an individual one of these spring plungers 72 associated with each of the switch actuators 64 in all of the switch assemblies 61. It will be seen from the foregoing that when the cam riding projection 64a of the switch actuator drops off of a cam shoulder 99 on its respective cam disk 62, the switch actuator 64 swings bodily as a unit toward the right (Figure 4) around the other cam riding projection 64b, then serving as a fulcrum. Conversely, when this other cam riding projection 64b snaps inwardly off a cam shoulder on its respective cam disk 63, the switch actuator is oscillated bodily toward the left around the other cam riding projection 64a, which then functions as a point of fulcrum support. The cam shoulders and cam formations in the two cam disks 62 and 63 may be shaped to give any desired action to the switch contacts. One embodiment of these cam shoulders and cam formations will be described after I have described the switch spring blades and their contacts.

Referring now to these switch springs and their contacts and the manner in which they are actuated, each switch actuator 64 is formed with an upwardly extending lug 81, which projects upwardly above the level of the cam disks 62 and 63. This lug extends up through a slot 83 punched in an insulating link 84 whereby the oscillatory throw of the switch actuator 64 to the right or to the left can be transmitted as a to and fro endwise movement in the link 84. This insulating link can be connected at one end to a single contact spring mounted on one side wall of the housing, or it can be connected at opposite ends to separate contact springs mounted on opposite side walls of the housing. In the arrangement shown in Figure 4, the right hand end of the link is arranged to actuate a single contact spring 85, which has its lower end anchored to the right hand side wall, as by a rivet 88. The upper end of said contact spring is formed with a hook shaped portion 86 which hooks into an opening 87 in the end of the insulating link 84. The riveted attachment 88 at the lower end of the contact spring establishes a connection with a connector terminal 89, or a connection with one side of the control circuit, and the upper portion of the spring carries either front or back movable contacts, or both, adapted for cooperative engagement with either front or back stationary contacts, or both. In the construction illustrated in Figure 4, the spring carries a movable front contact 90 adapted to engage a cooperating stationary contact 92. The contact 92 has riveted connection with a connector terminal 94. When the contact spring is of the double throw type, having front and back movable contacts, the spring normally remains in an open circuit neutral position so long as both cam riders 64a and 64b are riding on the high parts of their respective cam disk peripheries. When the cam follower arm 64a drops off a cam shoulder on the disk 62, the pressure of the spring plunger 72 oscillates the switch actuator 64 in a clockwise direction toward the right and this allows the contact spring 85 to bring contacts 90 and 92 together. Conversely, when the other cam follower arm 64b drops off a cam shoulder in its disk 63, the pressure of the spring plunger 72 oscillates the switch actuator 64 in a counter-clockwise direction toward the left, and thereby pulls the contact spring 85 toward the left for opening the contacts 90 and 92. When the contact spring is of the double throw type, having front and back contacts, the contact spring normally remains in an open circuit neutral position so long as both cam riders 64a and 64b are riding on the high part of the cam disk peripheries. In this embodiment of Figure 4, using a single contact spring 85, the switch actuator lug 81 passes up through a relatively long slot 83 in the link 84, and has a hook shaped upper end 82 which can hook over the left hand end of the slot. This arrangement facilitates assembly by enabling the slot 83 to be hooked over the end portion 82, the tension of the contact spring 85 tending to hold the left hand end of the slot 83 pressed against the portion 82.

Referring now to the embodiment illustrated in Figure 5 using a multiple arrangement of contact springs, in this embodiment the insulating link is formed with a shorter slot 83a, which engages over the projecting lug 81a of the switch actuator in such manner that the lug can impart positive thrusting movement to the insulating link in both directions. The left hand end 84a of the link is operatively connected to another contact spring 85a through a medium of a hooked end 86a on this spring, engaging in an opening 87a in the insulating link in the same manner described above of the right hand switch assembly. It will also be understood that in this multiple spring embodiment the two contact springs may be provided with various combinations of front and back contacts, for two or more control circuits in a timed relation. For example, the movement of the left hand contact spring 85a can be arranged to open a control circuit almost simultaneously with, but just ahead of the closing of another control circuit by the movement of the other contact spring 85, or vice versa.

The cam disks 62 and 63 are each adapted to have three cam levels 96, 97 and 98, and they are also adapted to have drop-off shoulders 99. The intermediate cam levels 97 are utilized in situations where one or more contact springs 85 or 85a have intermediate positions in which they are spaced from both front and back contacts. The drop-off shoulders 99 produce a very quick throw of the switch actuators 64 so as to obtain a quick opening of closed contacts. Owing to the fact that the cam follower 64a responds to drop-off shoulders on one cam disk, and the other cam follower 64b responds to drop-off shoulders on the other cam disk, it is possible to have two of such drop-off shoulders accurately start and stop a time interval of extremely short duration. For example, assuming an angular span of 60 degrees between the cam followers 64a and 64b, the two drop-off shoulders on the two cams could be spaced only a very small distance further apart than the cam followers, such as 61 degrees, in which event a control interval can be started and stopped within one degree of rotation of the rotor assembly.

It will be observed that the two cam rider arms 64a and 64b are rigid parts of a unitary cam rider unit 64 which has a floating mounting that permits this cam rider unit to rise and fall vertically with a translational motion, as well as to oscillate to right or left. Any vertical translational motion of the cam rider unit 64, as from the condition when both arms 64a and 64b ride on low levels 96 of their respective cam disks, to the condition when both arms ride on high levels of their cam disks, or vice versa, does not produce switch actuation in the preferred embodiment of the invention, this being caused only by lateral oscillatory motion of the cam rider unit.

Referring now to the operation of one typical embodiment of my improved sequence switch, when the device is not in use, the electric motor 27 stands idle and the rotor shaft 26 stands idle in a predetermined normal angular position. To start the automatic cycle of the sequence switch, and thus start the automatic program of the washing machine, the housewife merely rotates the control knob 31 a short distance in a clockwise direction, so as to actuate a particular one of the sequence switch assemblies that controls the circuit of the motor 27. Thereby, the motor is energized and the rotor shaft 26 starts its slow rotation. As the cycle progresses, the individual sequence switches are actuated in the predetermined order of the program for controlling the different operations of the washing machine. If the housewife should desire to shorten a soaking interval, or a washing interval, or some other interval in the automatic cycle, all that she has to do is to turn the knob 31 in a forward, clockwise direction when the machine has just started operation in that interval, or has been operating in that interval. She can shorten that interval to any desired degree, depending upon how far forward she rotates the knob in a clockwise direction. At the conclusion of the automatic cycle or program, the aforesaid switch unit that controls the electric motor 27 comes into operation and interrupts the circuit of the motor, thereby stopping the operation of the entire machine, with the rotor shaft 26 restored to its normal angular position. If, during the running of the automatic cycle, any abnormal condition should occur, such as jamming of the clothes, overflow of water, or imperative interruption, the housewife can instantly stop the operation of the entire machine, including the operating parts of the washing machine, by merely pushing in on the knob 31 and thereby opening the master switch. This stops the motor 27 and de-energizes all electrically controlled and electrically actuated parts of the washing machine.

While I have illustrated and described what I regard to be the preferred embodiment of my invention, nevertheless it will be understood that such is merely exemplary and that numerous modifications and rearrangements may be made therein without departing from the essence of the invention.

I claim:

1. In electrical switch mechanism, the combination of a plurality of concentrically mounted, concurrently rotating cam disks, a cam rider member having a plurality of rigidly related cam rider arms each riding on the periphery of a different one of said cam disks, whereby said rider member is caused to have lateral oscillatory motion as said rider arms follow cam formations in the peripheries of their respective cam disks, and switch means responsive to such lateral oscillatory motion of said rider member.

2. In electrical switch mechanism, the combination of a plurality of concentrically mounted, concurrently rotating cam disks, a cam rider member having a plurality of rigidly related cam rider arms each riding on the periphery of a different one of said cam disks, mounting means enabling said rider member to have lateral movement relatively to said cam disks, whereby said rider member can oscillate laterally as said cam rider arms follow cam formations in the peripheries of their respective cam disks, and switch means responsive to such later oscillation of said rider member.

3. In electrical switch mechanism, the combination of a plurality of concentrically mounted, concurrently rotating cam disks, a cam rider member having a plurality of rigidly related cam rider arms each riding on the periphery of a different one of said cam disks, floating mounting means enabling said rider member to have translational motion and tilting motion relatively to said cam disks, whereby said rider member can tilt alternatively about one or the other of said rider arms as said arms follow cam formations in said cam disks, and switch means responsive to such tilting motion of said rider member.

4. In electrical switch mechanism the combination of two concentrically mounted concurrently rotating cam disks, a cam rider member having two cam rider arms each riding on the periphery of a different one of said cam disks, means mounting said cam rider member whereby it can tilt selectively about either one of said cam rider arms as said arms follow cam formations in said cam disks, and switch means responsive to tilting motion of said cam rider member.

5. In electrical switch mechanism, the combination of a plurality of cams, cam rider means comprising a plurality of cam rider arms each having a point of engagement on a separate one of said cams, means of supporting said cam rider means whereby it can tilt selectively about any one of such points of engagement, and circuit controlling means responsive to the tilting motion of said cam rider means.

6. In electrical switch mechanism, the combination of a plurality of rotating cams, a cam rider member comprising a plurality of cam rider arms each having a point of engagement on a separate one of said rotating cams, spring means affording a floating mounting for said cam rider member whereby it can tilt selectively about any one of said points of engagement of said cam rider arms on said cam, and circuit controlling means responsive to the tilting motion of said cam rider member.

7. In electrical switch mechanism, the combination of a plurality of concurrently rotating cams, a cam rider member comprising a plurality of cam rider arms each having a point of engagement on a different one of said cams, spring means tending to hold said cam rider arms in pressure contact against their respective cams, said spring means acting along a line between said cam rider arms, whereby said cam rider member can tilt selectively about any one of said points of pressure engagement, and circuit controlling means responsive to said cam rider member.

8. In electrical switch mechanism, the combination of a plurality of concentrically mounted concurrently rotating cam disks, a cam rider member having a plurality of rigidly related cam rider arms each riding on the periphery of a different one of said cam disks, a spring plunger acting on said cam rider member at a point between said cam rider arms for holding said arms pressed yieldingly against said cam disks, said spring plunger enabling said cam rider member to tilt laterally about any one of said cam rider arms as another of said arms follows cam formations in its cam disk, and switch means responsive to such tilting motion of said cam rider member.

9. In electrical switch mechanism, the combination of a plurality of concentrically mounted, concurrently rotating cam disks, a cam rider member having a floating mounting between said cam disks, said cam rider member comprising a plurality of cam rider arms each riding on the periphery of a different one of said cam disks, whereby said cam rider member is adapted to oscillate laterally as said cam rider arms follow cam formations in the peripheries of their respective cams, and switch means responsive to such lateral oscillation of said cam rider member.

10. In an automatic timer for performing a plurality of electrical switch operations in a predetermined sequence, the combination of a drive shaft, an electric motor imparting a slow speed continuous rotation to said drive shaft, a plurality of sequence switch units mounted on said drive shaft, each of said switch units comprising a pair of concentrically mounted concurrently rotating cam disks adapted for rotation by said shaft, a cam rider disposed between said pair of disks and comprising cam rider arms projecting laterally therefrom to each side for riding on the peripheries of said cam disks, said cam rider having a floating mounting between its pair of companion disks, means rotating with said shaft operatively connected with the cam disks of all of said switch units for driving said cam disks but without driving said cam riders a spring plunger imparting pressure to said cam rider at a point between said cam rider arms for holding said arms in yieldable pressure engagement against their respective cam disks, said cam rider being capable of tilting movement relatively to said spring plunger, an insulating link operatively connected with said cam rider, a contact spring actuated by said insulating link, and cooperating contacts moved into and out of engagement by the motion of said contact spring.

11. In an automatic timer for performing a plurality of electrical switching operations in a predetermined sequence, the combination of a drive shaft, an electric motor, means for imparting a slow speed continuous rotation from said motor to said drive shaft but enabling said drive shaft to be manually advanced independently of said motor, a plurality of sequence switch units assembled along said drive shaft, each of said switch units comprising a pair of concentrically mounted concurrently rotating cam disks driven by said shaft, a cam rider disposed between said pair of disks and comprising a cam rider arm projecting laterally therefrom to each side for riding on the peripheries of said cam disks, said cam rider having a floating mounting between its pair of companion disks, a spring plunger imparting pressure to said cam rider at a point between said cam rider arms for holding said arms in yieldable pressure engagement against their respective cam disks, said cam rider being capable of tilting movement relatively to said spring plunger, an insulating link operatively connected with said cam rider, contact springs disposed on opposite sides of said drive shaft and adapted to be actuated from opposite ends of said insulating link, movable and stationary contacts adapted to be moved into and out of engagement by said contact springs, and a control knob on said drive shaft operative to advance the shaft manually independently or ahead of said electric motor.

12. In an automatic timer for performing a plurality of electrical switch operations in a predetermined sequence, the combination of a drive shaft, an electric motor for imparting a slow speed continuous rotation to said drive shaft, means operatively connected between said electric motor and said drive shaft enabling said drive shaft to be advanced in a forward direction independently of said electric motor, a plurality of pairs of concentrically mounted, concurrently rotating cam disks driven by said drive shaft, a cam rider member for each pair of cam disks having a plurality of cam rider arms each riding on the periphery of a different one of said companion disks, mounting means enabling said rider member to have lateral movement relatively to said cam disks, whereby said rider member can oscillate laterally as said cam rider arms follow cam formations in the peripheries of their respective cam disks, switch means responsive to such lateral oscillation of said rider member, a control knob mounted on said drive shaft and operative to advance said shaft by manual actuation in a forward direction independently of axial shifting movement of said shaft, said control knob being slidable on said shaft, and manually responsive switch means adapted to be actuated by sliding movement of said control knob.

13. In an automatic timer for performing a plurality of electrical switch operations in a predetermined sequence, the combination of a drive shaft, an electric motor connected to drive said shaft, a plurality of sequence switch units assembled along said drive shaft and actuated thereby in predetermined sequence, a master switch comprising relatively movable contacts having relative circuit opening and closing movement in a plane extending substantially at right angles to the axis of said shaft, a control knob mounted on said shaft for enabling the shaft to be angularly advanced manually for shortening a sequence interval independently of shifting motion of said shaft, said knob being slidable on said shaft independently of shifting motion of said shaft, and means responsive to said sliding motion for actuating the relatively movable contacts of said master switch, whereby said shaft can be advanced manually without actuating said master switch and whereby said master switch can be actuated without advancing said shaft.

14. In an automatic timer for performing a plurality of electrical switching operations in a predetermined sequence, the combination of a drive shaft, an electric motor for imparting a slow speed continuous rotation to said drive shaft, a plurality of sequence switch units assembled along said drive shaft, each of said switch units comprising a pair of concentrically mounted concurrently rotating cam disks driven by said shaft, said cam disks having low levels, intermediate levels, high levels and drop-offs on their peripheries a cam rider member having a plurality of cam rider arms each riding on the periphery of a different one of said cam disks, whereby said rider member is caused to have lateral oscillatory motion as said rider arms follow the above formations in the peripheries of their respective cam disks, switch means responsive to such lateral oscillatory motion of said rider member, and clutch means interposed between said electric motor and said drive shaft for enabling said drive shaft to be rotated manually independently of said electric motor.

15. In an automatic timer for performing a plurality of electrical switching operations in a predetermined sequence, the combination of a drive shaft, an electric motor, a one-way drive device for imparting a slow speed continuous rotation to said drive shaft from said electric motor, said one-way drive device permitting said drive shaft to be angularly manually advanced in a forward direction relatively to said electric motor and independently of shifting motion of said shaft, a plurality of sequence switch units assembled along said drive shaft and actuated thereby in predetermined sequence, a master switch comprising relatively movable contacts having relative circuit opening and closing movement in a transverse plane extending substantially at right angles to the axis of said shaft, a control knob mounted on said shaft for enabling said shaft to be advanced manually independently of said electric motor, said knob being slidable on said shaft independently of shifting motion of said shaft, bell crank lever means responsive to said sliding motion of the knob in the longitudinal plane of said shaft for actuating said master switch by causing relative separating motion between said contacts in said transverse plane, and spring detent means for holding said knob in its different shifted positions.

16. In electrical switch mechanism, the combination of an axial shaft, a drive pin extending parallel with said axial shaft and rotating around the axis thereof, a plurality of cam disks mounted on said axial shaft and having openings engaging said drive pin so as to be driven thereby, a cam rider member disposed between a pair of cam disks and having a central opening therein which said drive pin can rotate without driving said rider member, said cam rider member having arms projecting laterally therefrom to each side for riding of the peripheries of said pair of cam disks, and circuit controlling means responsive to a tilting motion of said cam rider member.

17. In electrical switch mechanism, the combination of an axial shaft, an electric motor imparting a slow speed continuous rotation to said shaft, a pair of concurrently rotating cam disks concentrically mounted on said shaft, a cam rider member disposed between said cam disks, said cam disks being driven by said shaft, said cam rider member having a relatively large central opening therein which enables said rider member to tilt relatively to said shaft without being driven thereby, a spacing member mounted on said shaft and disposed in said relatively large opening for holding said cam disks from frictional pressure against said cam rider member, said cam rider member having a pair of arms projecting laterally therefrom to each side for riding on the peripheries of said pair of cam disks, whereby said rider member can tilt selectively about either one of said cam rider arms as said arms follow cam formations in their respective cam disks, and switch means responsive to such tilting motion of said cam rider member.

18. In electrical switch mechanism, the combination of a plurality of concentrically mounted, concurrently rotating cam disks, a cam rider member having a plurality of cam rider arms each riding on the periphery of a different one of said cam disks, mounting means enabling said rider member to have a tilting movement relatively to said cam disks whereby said cam rider member can oscillate laterally as said cam rider arms follow cam formations in the peripheries of their respective cam disks, said cam disks having low levels, intermediate levels, high levels and drop-off shoulders, switch means having one circuit controlling position in one direction and another circuit controlling position in the other direction and having an intermediate neutral position, and means for transmitting motion from said cam rider member to said switch means whereby said switch means can be actuated in either direction and whereby said switch means is disposed in neutral position when both of said cam rider arms are on intermediate levels of their respective cam disks.

WILLIAM P. GALLAGHER.

REFERENCES CITED

The following references are of record in the file of this patent:

UNITED STATES PATENTS

| Number | Name | Date |
| --- | --- | --- |
| 1,113,592 | Wright et al. | Oct. 13, 1914 |
| 1,497,827 | Acker | June 17, 1924 |
| 1,708,225 | Kroeger | Apr. 9, 1929 |
| 2,187,795 | Scott et al. | Jan. 23, 1940 |
| 2,313,064 | Hall | Mar. 9, 1943 |
| 2,394,142 | Breckenridge | Feb. 5, 1946 |

Certificate of Correction

Patent No. 2,527,249 October 24, 1950

WILLIAM P. GALLAGHER

It is hereby certified that error appears in the printed specification of the above numbered patent requiring correction as follows:

Column 8, line 48, for "later" read *lateral*; column 12, line 6, for the word and hyphen "there-" read *therein*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*